United States Patent [19]

Stroup et al.

[11] Patent Number: 4,901,568

[45] Date of Patent: Feb. 20, 1990

[54] HOOD ASSEMBLY FOR OPACITY MONITOR

[75] Inventors: Gregory Stroup; Michael A. Krapf, both of Butler, Pa.; Arthur L. Carpenter, Clarence, N.Y.

[73] Assignee: International Chimney Corporation, Buffalo, N.Y.

[21] Appl. No.: 267,810

[22] Filed: Nov. 7, 1988

[51] Int. Cl.⁴ .................. G01D 11/24; G12B 9/02
[52] U.S. Cl. .................................. 73/431; 73/23; 356/438
[58] Field of Search ............ 73/23, 431, 863.81; 206/305, 468; 248/DIG. 4; 356/438, 439

[56] References Cited

FOREIGN PATENT DOCUMENTS

| 0187667 | 7/1986 | European Pat. Off. ............ 73/431 |
| 2747880 | 4/1979 | Fed. Rep. of Germany ........ 73/431 |
| 2747879 | 5/1979 | Fed. Rep. of Germany ........ 73/431 |
| 2756447 | 6/1979 | Fed. Rep. of Germany ........ 73/431 |

*Primary Examiner*—John Chapman
*Assistant Examiner*—Joseph W. Roskos
*Attorney, Agent, or Firm*—Hodgson, Russ, Andrews, Woods & Goodyear

[57] ABSTRACT

A hood assembly for opacity monitoring equipment including an opacity monitor fixedly secured to an outside surface of a smokestack or chimney includes a hood for protectably covering the opacity monitor and associated guide. The guide is connectable to the monitor in a stationary relationship therewith and cooperates with the hood for guiding bodily displacement of the hood relative to the monitor along a substantially vertical path between a lowered condition at which the monitor is substantially covered by the hood and an elevated condition at which the monitor is accessible.

17 Claims, 1 Drawing Sheet

U.S. Patent  Feb. 20, 1990  4,901,568
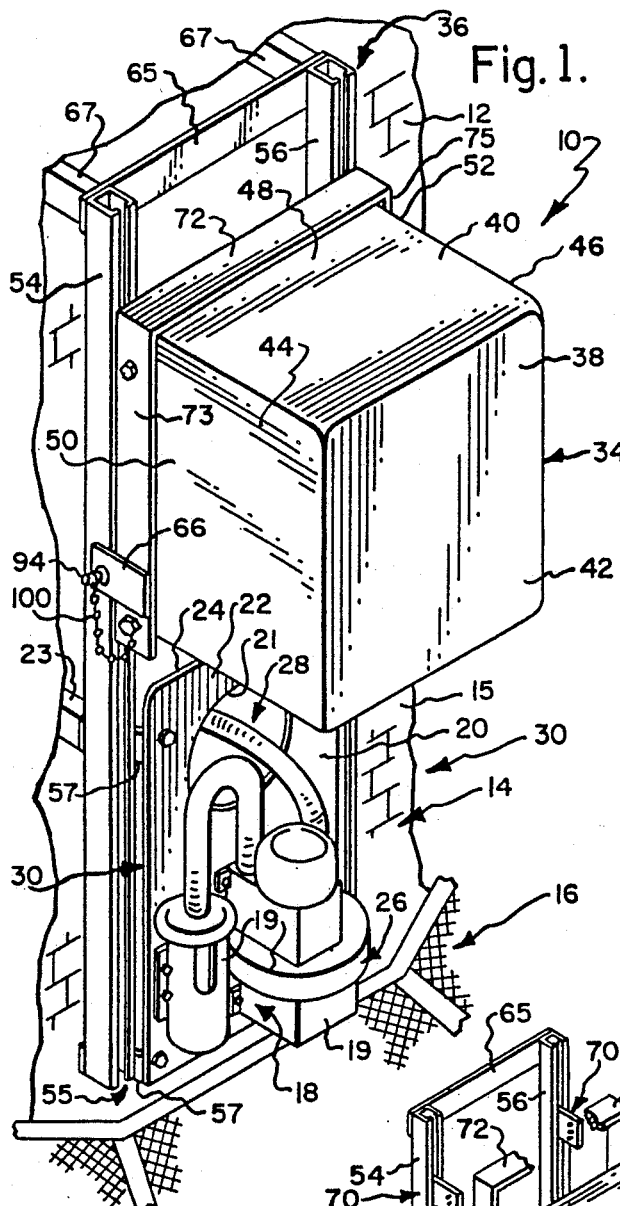
Fig. 1.
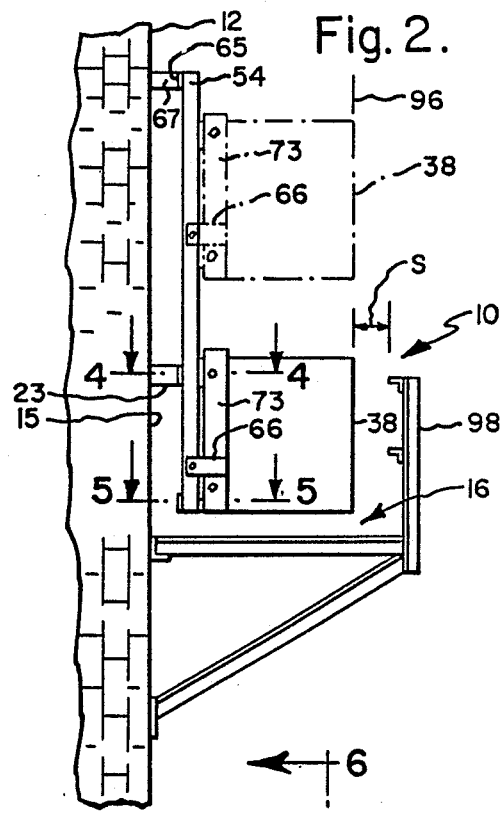
Fig. 2.
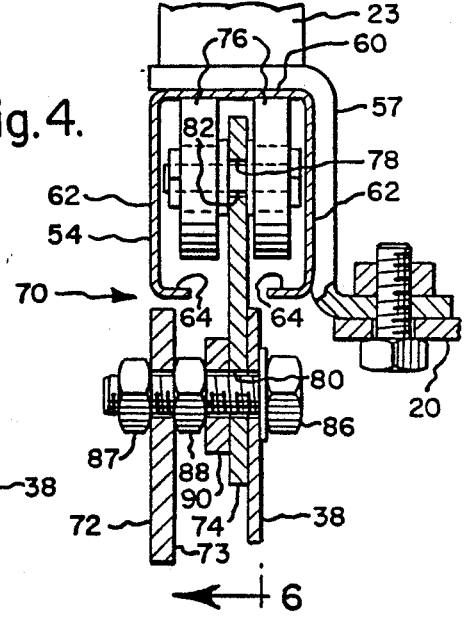
Fig. 4.
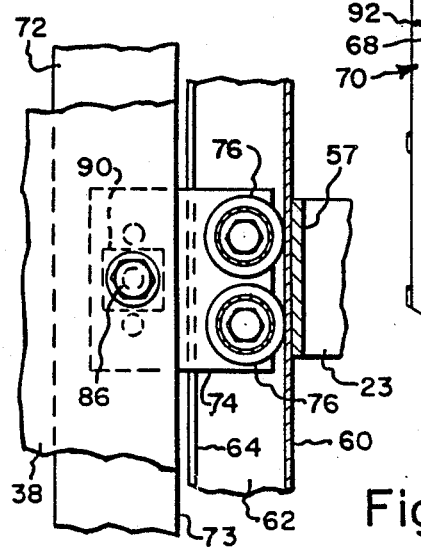
Fig. 3.
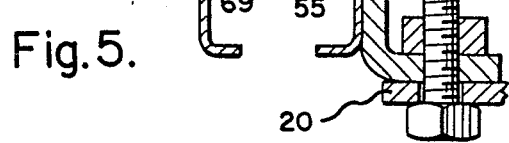
Fig. 5.
Fig. 6.

HOOD ASSEMBLY FOR OPACITY MONITOR

BACKGROUND OF THE INVENTION

This invention relates generally to opacity monitoring equipment and relates more particularly to a hood assembly for an opacity monitor.

The opacity monitoring equipment with which this invention is concerned is commonly utilized in connection with an industrial smokestack or chimney for monitoring the cleanliness of gases discharged through the smokestack or chimney. Such equipment commonly includes an opacity monitor comprised of a system of monitoring components fixedly attached to a back, or blower, plate which is, in turn, fixedly attached to the outside surface of the smokestack. An appropriate conduit connected in flow communication between the inside of the smokestack and the opacity monitor routes the smokestack gas to the monitor.

For protection of an opacity monitor from rain or other weather-related elements, a hood is positioned over the monitor so as to substantially cover the top, front and two opposite sides of the monitor and is held in place by appropriate connections to the blower plate. A hood of a conventional hood assembly has heretofor been connected to the blower plate adjacent an upper edge thereof to permit the hood to be pivotally moved about a horizontally-oriented pivot axis positioned adjacent the smokestack from a first, or lowered, condition at which the hood operatively covers the opacity monitor to a second, or elevated, condition at which the hood is generally positioned above the monitor. Movement of the hood to the aforedescribed second, or elevated, position permits operator access to the monitor.

A disadvantage associated with the aforedescribed connection between the hood and blower plate relates to the space necessary to pivot the hood between the aforesaid lowered and elevated conditions. A conventional hood is generally tall as measured from top to bottom for spanning the generally tall height of the blower plate when covering the opacity monitor so that as the hood is pivoted between the lowered and elevated conditions, the horizontally-oriented pivot axis confines the pivotal movement of the hood or, more specifically, the lowermost edges of the hood, along a relatively wide swing extending from the outside surface of the smokestack to a location positioned outwardly from and relatively remote of the smokestack surface. Hence, the movement of the hood between the lowered and elevated conditions requires a relatively large amount of space as measured along a horizontal path extending generally perpendicular to the outside surface of the smokestack. Because an opacity monitor is commonly mounted at a relatively high elevation upon a smokestack and approachable only by means of a platform or similar walkway attached to a side of the smokestack and positioned immediately beneath the opacity monitor, the aforedescribed hinged connection between a hood and blower plate requires that the hand railing associated with the platform to accommodate the relatively wide swing of the hood between lowered and elevated conditions. In particular, the railing must be spaced relatively far from the smokestack surface in the vicinity of the monitor to accommodate the swing of the hood and is generally much more costly to construct or modify than it would be if the railing need only be relatively close to the smokestack surface in the vicinity of the monitor or need not be modified at all.

Accordingly, it is an object of the present invention to provide a new and improved hood assembly for an opacity monitor circumventing the aforedescribed disadvantage associated with a conventional hood and its pivotal attachment to a blower plate.

Another object of the present invention is to provide such a hood assembly having a hood which requires little space as measured from the outside surface of a smokestack for moving the hood between lowered and elevated conditions.

Still another object of the present invention is to provide such a hood assembly wherein the hood is stability connected to an opacity monitor with which it is used during movement between the lowered and elevated conditions.

Yet still another object of the present invention is to provide such an hood assembly which is economical to manufacture and effective in operation.

SUMMARY OF THE INVENTION

This invention resides in a new and improved hood assembly for opacity monitoring equipment including an opacity monitor fixedly secured to an outside surface of a smokestack or the like.

The hood assembly is comprised of hood means for substantially covering the front, top and sides of an opacity monitor and associated guide means connectable to the opacity monitor in a stationary relationship therewith. The guide means cooperates with the hood means for guiding the bodily displacement of said hood means relative to the monitor along a substantially vertical path from a lowered condition at which the monitor is substantially covered by the hood means and an elevated condition at which the monitor is accessible.

Because the guide means of the hood assembly confines displacement of the hood means substantially along a vertical path, any need for structuring smokestack platforms to facilitate any wide swinging movement of the hood means between lowered and elevated conditions is obviated.

BRIEF DESCRIPTION OF THE DRAWING FIGURES

FIG. 1 is a perspective view of a hood assembly in accordance with the present invention shown utilized with opacity monitoring equipment, and illustrating the assembly hood when positioned in a elevated condition.

FIG. 2 is an side view of the FIG. 1 assembly as seen generally from the left in FIG. 1 illustrating the assembly hood when positioned in a lowered condition.

FIG. 3 is a fragmentary perspective view of the FIG. 1 hood assembly, shown exploded.

FIG. 4 is a cross-sectional view taken about on line 4—4 of FIG. 2.

FIG. 5 is a cross-sectional view taken about on line 5—5 of FIG. 2.

FIG. 6 is a cross-sectional view taken about on line 6—6 of FIG. 4.

DETAILED DESCRIPTION OF AN ILLUSTRATIVE EMBODIMENT

Turning now to the drawings in greater detail and considering first FIGS. 1 and 2, there is shown an embodiment, generally indicated 10, of a hood assembly in accordance with the present invention shown utilized in an environment in which the assembly 10 is adapted for use. Such an environment includes a chimney or smokestack 12 and opacity monitoring equipment 14 operatively associated with the smokestack 12. Inasmuch as the opacity monitoring equipment 14 is mounted at a relatively high elevation upon the outside surface, indicated 15, of the smokestack 12, a relatively narrow walkway platform 16 is connected to the outside of the smokestack 12 and beneath the equipment 14 for providing approach to the equipment 14.

The opacity monitoring equipment 14 such as is shown in FIG. 1 is associated with the smokestack 12 for measuring the cleanliness of gases discharged through the smokestack 12. The construction of the equipment 14 is well-known in the art and includes an opacity monitor 18 comprised of various components, indicated generally 19, and a back plate or blower plate 20 upon which the components 19 of the monitor 18 are fixedly secured. A conduit 22 is connected in flow communication with the monitor 18 and the interior of the smokestack 12 through an opening (not shown) in the side of the smokestack 12 and an opening 21 in the blower plate 20 for routing samples of gas discharged through the smokestack 12 to the monitor 18.

The blower plate 20 is in the form of a generally rectangular-shaped plate having front and back faces 22,24, respectively, and is constructed of a rigid material, such as steel. The blower plate 20 is fixedly connected by means of brackets 23 or other suitable means to the outside surface 15 of the smokestack 12 so as to be oriented generally vertically and arranged so that the back face 24 of the plate 20 generally faces the outside surface 15. The components 19 of the opacity monitor 18 are, in turn, attached to the front face 22 of the plate 20 in a relatively compact fashion and so as to define a front 26, a top 28, and two sides 30 and 32 of the monitor 18.

With reference to FIGS. 1–3 and in accordance with the present invention, the hood assembly 12 includes hood means 34 for substantially covering the monitor 18 when operatively positioned thereover in a manner hereinafter described and associated guide means 36. The hood means 34 is in the form of a generally rectangularly-shaped hood 38 having a planar top 40, a planar front 42 oriented perpendicular to the top 40, and two opposite and parallel sides 44,46 oriented perpendicular to both the top 40 and front 42. The hood 38 is constructed of steel and preferably coated or painted to preserve the useful life of the hood 38. For a reason hereinafter apparent, the hood top 42 defines a back edge 48 and the two hood sides 44,46 define back edges 50, 52, respectively, with each of the back edges 48, 50 or 52 located adjacent the outside surface 15 of the smokestack 12.

With reference still to FIGS. 1 and 2, the guide means 36, mentioned earlier, cooperates with the hood means 34 to guide bodily displacement of the hood 38 along a substantially vertical path between a lowered condition as shown in solid lines in FIG. 2 to an elevated condition as shown in FIG. 1. When positioned in the aforesaid lowered condition, the hood 38 substantially covers the front 26, top 28 and sides 30,32 of the opacity monitor 18 and protects the monitor from weather-related elements. When positioned in the aforesaid elevated condition, the hood 38 permits operator access to the monitor components 19.

With reference to FIGS. 3-5, the guide means 36 includes a pair of guide tracks 54,56 connected to the blower plate 20 so that the tracks 54,56 are each arranged generally vertically and positioned adjacent a corresponding side of the plate 20 so as to be spaced slightly farther apart than the distance as measured between the hood sides 44,46. As best shown in FIG. 4, each track 54 or 56 is somewhat C-shaped in cross-section having a back 60, two side legs 62,62 and opposing flanges 64,64 at the free ends of the legs 62,62 of the C. For connection of each track 54 or 56 to the blower plate 20, four offset-Zee connectors 57,57 (see FIG. 3) are bolted between the tracks 54,56 and corners of the plate 20 so as to rigidly and stably secure the tracks 54,56 to the plate 20. Furthermore, the length of each track 54 or 56 as measured from one end to the other is equal to about twice the height of the blower plate 20. A brace member 65 is bolted or welded across the uppermost ends of the tracks 54,56, and a bracket member 67 (FIG. 2) is attached between the brace member 65 and smokestack surface 15 for rigidity of the assembly 10. For a reason hereinafter apparent and as shown in FIG. 5, the lowermost ends of each track 54 or 56 include an end stop 55 in the form of a nut and bolt arrangement 69 which spans the channel of the defined C so as to block the channel and as shown in FIG. 3, the track 54 defined a horizontally-oriented opening 68 in the upper one-half of the track 54.

For cooperative attachment of the hood 36 to the guide tracks 54,56 and with reference to FIGS. 4 and 6, the hood means 34 further includes four track followers in the form of trolley assemblies 70,70 captured within the C of the guide tracks 54,56 and a U-shaped support bracket 72 attached between the hood 36 and trolley assemblies 70,70. The support bracket 72 includes two legs 73,75 and is bolted or welded to the back edges 48, 50,52 of the hood 36 with bolts 86,86 in the manner shown in FIG. 4 so as to provide a degree of structural rigidity to the hood 36 and to serve as a strong support member between the hood 36 and trolley assemblies 70,70. Thus, the support bracket 72 is constructed of steel or other suitable material, and as shown in FIG. 3, the legs 74,76 of its U are slightly further apart then the distance as measured between the hood sides 44 and 46.

With reference again to FIGS. 4 and 6, each trolley assembly 70 includes a steel plate 74 and four wheels 76,76 suitably journaled to the plate 74. The plate 74 defines two openings 78 (only one shown in FIG. 4) adjacent one edge thereof and three openings 80 (one shown in FIG. 4) adjacent the opposite edge thereof. An axle member 82 extends through each opening 80 or 80 and two wheels 76,76 are connected at opposite ends of each axle 82. As exemplified by the assembly 70 of FIG. 4, the wheels 76,76 of each assembly 70 are operatively positioned within the C of a corresponding track 54 or 56 and each assembly 70 of such width as measured across a pair of joined wheels 76,76 that each assembly 70 is captured with the C of its corresponding track 54 or 56 and movement of the assembly 70 relative thereto is generally confined to a path extending along the length of the track 54 or 56.

As best shown in FIG. 4, each trolley assembly 70 is connected to a corresponding leg 73 or 75 of the support bracket by means of bolts 86,86. Spacer members 88,90 having openings which are aligned with a corresponding opening 80,80 of a trolley assembly plate 74 and an aligned opening in the leg 73 or 75 are positioned between the support bracket 72 and the assembly plate 74. The shank of each bolt 86 extends through the aligned openings in the hood 38, assembly plate 74, spacer members 88,90 and bracket 72 so that the plate 74 and bracket 72 are retainably held together between the head of the bolt 86 and a nut 67 threadably accepted about the end of the bolt shank. With reference again to FIG. 4, it will be understood that the spacer members 88,90 are sized so that when held together in the manner shown, each trolley assembly plate 74 and the corresponding leg 73 or 75 of the support bracket 72 are substantially parallel to one another.

When positioned in the lowered condition, as shown in solid lines in FIG. 2, so as to operatively and protectably cover the opacity monitor 18, the wheels of the lowermost trolley assemblies 70,70 rest upon the end stops 55,55 located at the lowermost ends of the tracks 54,56 so that the hood 39 is spaced a relatively short distance from the walkway platform 16. To subsequently move the hood 38 from the lowered condition to the elevated condition, as shown in solid lines in FIG. 1, the hood 38 is manually lifted from the lowered condition to the elevated condition as the wheels 76,76 of the trolley assemblies 70,70 are guided vertically along the guide tracks 54,56. For purposes of releasably securing the hood 38 in the elevated condition, there is attached to the support bracket leg 73 a plate 66 (FIGS. 1 and 3) defining a through-opening 92 which is aligned with the opening 68 of the track 54 when the hood 38 is positioned in its elevated condition and a drawbar pin 94, secured to the plate 66 by means of a chain 100, is manually inserted through the aligned openings. It will be understood that when the hood 38 positioned in the elevated condition, the opacity monitor 18 is accessible beneath the hood 38. To return the hood 38 from the elevated condition to the lowered condition, the pin 94 is removed from the aligned openings 92 and 68 and the hood 38 is lowered to the lowered condition.

As the hood 38 is moved or bodily displaced between the aforedescribed lowered and elevated conditions, the guided movement of the trolley assemblies 70,70 confine the bodily movement of the hood generally along a substantially vertical path. Thus, and with reference to FIG. 2, the horizontal spacing S which exits between the front 42 of the hood 38 and the railing, indicated 98, of the platform 16 is substantially constant throughout the vertical displacement of the hood 38. Therefore, the horizontal spacing as measured generally outwardly from the outside surface of the smokestack 12 required to operatively displace the hood 38 is relatively small, and any need to modify or reconstruct the railing 98 to accommodate such displacement is obviated.

Another advantage provided by the assembly 10 relates to the stability of the interconnection between the hood 38 and guide tracks 54,56. In particular, it will be noted that the four trolley assemblies 70,70 make, in essence, a four-point connection between the hood 38 and tracks 54,56 which enhances the stability of the hood assembly 10 when the hood 38 is moved between lowered and elevated condition. Such an enhancing of stability can be readily appreciated when compared to that provided by the two-point pivotal connection between the hood and blower plate of conventional assemblies.

It will be understood that numerous modifications and substitutions can be had to the aforedescribed embodiment 10 without departing from the spirit of the invention. For example, although it has been found that the hood 38, with attached support bracket 72, is of sufficient weight that the hood 38 need not be locked in the lowered condition to any prevent undesirable lifting of the hood 38 during a windstorm or the like, an additional pin and locking arrangement similar in construction to the pin 94 and locking arrangement provided by the plate opening 92 and opening 68 of the track 58 and hood 38 could be incorporated in the embodiment 10 to releasably lock the hood 38 in its lowered condition. Accordingly, the aforedescribed embodiment 10 is intended for the purpose of illustration and not as limitation.

We claim:

1. A hood assembly for opacity monitoring equipment including an opacity monitor fixedly secured to an outside surface of a smokestack or the like comprising:
   hood means for substantially covering the front, top and sides of an opacity monitor and
   guide means connectable to the monitor in a stationary relationship therewith and cooperating with said hood means for guiding bodily displacement of said hood means relative to the monitor along a substantially vertical path from a lowered condition at which the monitor is substantially covered by said hood means and an elevated condition at which the monitor is accessible.

2. A hood assembly as defined in claim 1 wherein one of said guide means and said hood means includes a guide track and the other of said guide means and said hood means includes a track follower operatively associated with said guide track for guided movement of said follower and track relative to one another as said hood means is displaced between said lowered and elevated conditions.

3. A hood assembly as defined in claim 2 wherein said guide track is included in said guide means and said track follower is included in said hood means.

4. A hood assembly as defined in claim 1 wherein one of said guide means and said hood means includes a pair of guide tracks and the other of said guide means and said good means includes two pairs of track followers, each pair of track followers being operatively associated with a corresponding one of said guide tracks for guided movement of each of said follower pair relative to the corresponding guide track as said hood means is displaced between said lowered and elevated conditions.

5. A hood assembly as defined in claim 4 wherein each guide track is C-shaped somewhat in cross-section and each pair of track followers includes two trolley assemblies connected to the corresponding guide track for relative movement therealong.

6. A hood assembly as defined in claim 5 wherein each trolley assembly includes at least one rotatable wheel captured within the C of the corresponding guide track for movement relative to and along the length of the guide track in rolling contact therewith.

7. A hood assembly as defined in claim 1 wherein said guide means includes at least one guide track, which, when connected in a stationary relationship to the opacity monitor is oriented generally vertically and said hood means includes a track follower operatively associated with said guide track for movement relative thereto and along the length thereof so that as said hood means is displaced relative to the opacity monitor, said track follower is vertically guided along said guide track.

8. A hood assembly as defined in claim 1 further comprising means for releasably securing said hood means in the elevated condition.

9. In combination:

opacity monitoring equipment including an opacity monitor fixedly secured to an outside surface of a smokestack and a hood assembly including (a) hood means for protectably covering the front, top and sides of said opacity monitor and (b) guide means attached to said monitor in a stationary relationship therewith and cooperating with said hood means for guiding bodily displacement of said hood means relative to said monitor along a substantially vertical path from the lowered condition at which said monitor is substantially covered by said hood means and an elevated condition at which said monitor is accessible.

10. The combination according to claim 9 wherein one of said guide means and said hood means includes a guide track and the other of said guide means and said hood means includes a track follower operatively associated with said guide track for guided movement of said follower and track relative to one another as said hood means is displaced between said lower and elevated conditions.

11. The combination of claim 10 wherein said guide track is included in said guide means and said track follower is included in said hood means.

12. The combination of claim 11 wherein said opacity monitoring equipment includes a blower plate to which said opacity monitor is attached and said guide track is fixedly secured in stationary relationship to said blower plate.

13. The combination of claim 9 wherein said opacity monitoring equipment includes a blower plate fixedly secured in a substantially vertical orientation to the outside surface of a smokestack or the like and said guide means includes a pair of guide tracks fixedly secured to said blower plate in a stationary relationship therewith and said hood means includes two pairs of track followers, each pair of track followers operatively associated with a corresponding one of said guide tracks for movement of each of said follower pair relative to the corresponding guide track as said hood means is displaced between said lowered and elevated conditions.

14. The combination of claim 13 wherein each guide track is somewhat C-shaped in cross-section and each pair of track followers includes two trolley assemblies connected to the corresponding guide track for relative movement therealong.

15. The combination of claim 14 wherein each trolley assembly includes at least one rotatable wheel captured within the C of the corresponding guide track for movement relative thereto and along the length of the guide track in rolling contact therewith.

16. The combination of claim 9 further comprising means for releasably securing said hood means in the elevated condition.

17. The combination of claim 16 wherein said guide means includes means defining one opening and said hood means includes means defining a second opening which is aligned with said one opening when said hood means is positioned in the elevated condition and said means for releasably securing includes a pin adapted to be releasably accepted by said aligned openings in said guide means and hood means.

* * * * *